(12) United States Patent
Okerlund et al.

(10) Patent No.: US 10,682,992 B2
(45) Date of Patent: *Jun. 16, 2020

(54) JACK ASSEMBLY

(71) Applicant: HORIZON GLOBAL AMERICAS INC., Plymouth, MI (US)

(72) Inventors: Kawa-She Quoen Okerlund, Wittenberg, WI (US); Frank Drake, Wausau, WI (US)

(73) Assignee: HORIZON GLOBAL AMERICAS INC., Plymouth, MI (US)

( * ) Notice: Subject to any disclaimer, the term of this patent is extended or adjusted under 35 U.S.C. 154(b) by 182 days.

This patent is subject to a terminal disclaimer.

(21) Appl. No.: 15/898,750

(22) Filed: Feb. 19, 2018

(65) Prior Publication Data

US 2018/0236981 A1   Aug. 23, 2018

Related U.S. Application Data

(63) Continuation of application No. 13/920,755, filed on Jun. 18, 2013, now Pat. No. 9,896,067.

(51) Int. Cl.
*B60S 9/18* (2006.01)
*B60D 1/66* (2006.01)
*B66F 3/16* (2006.01)

(52) U.S. Cl.
CPC ............... *B60S 9/18* (2013.01); *B60D 1/665* (2013.01); *B66F 3/16* (2013.01)

(58) Field of Classification Search
CPC ..... B60D 1/66; B60S 9/02; B60S 9/04; B60S 9/08; B60S 9/16; B60S 9/18; B66F 3/08; B66F 3/10; B66F 5/00; B66F 5/02; B66F 5/025; G01R 19/00
See application file for complete search history.

(56) References Cited

U.S. PATENT DOCUMENTS

| | | | |
|---|---|---|---|
| 1,649,526 A | 11/1927 | Herold | |
| 1,922,099 A | 8/1933 | Kilian | |
| 2,169,882 A * | 8/1939 | Noelting | ............. B60B 33/0002 16/38 |
| 2,294,807 A | 9/1942 | Schultz | |
| 2,638,315 A | 5/1953 | Wagner | |
| 3,487,495 A | 1/1970 | Schultz | |
| 3,658,359 A | 4/1972 | Claflin et al. | |
| 3,851,855 A | 12/1974 | Douglass | |
| 3,934,852 A * | 1/1976 | Weber | ...................... B60D 1/66 254/420 |
| 4,097,840 A | 6/1978 | Chappelle | |
| 4,265,429 A | 5/1981 | Formhals | |
| 4,623,125 A | 11/1986 | Ebey | |
| 4,702,458 A | 10/1987 | Kendrick | |

(Continued)

*Primary Examiner* — Tyrone V Hall, Jr.
(74) *Attorney, Agent, or Firm* — McDonald Hopkins LLC (57) ABSTRACT

A jack assembly is shown and describe. The jack assembly may include a first tube having first and second end portions and a central portion between the first and second end portions, and a second tube positioned within the first tube and movable with respect to the first tube. The jack assembly may also include an expanded portion on the first tube, the expanded portion having a larger inner diameter than an inner diameter of the central portion, and a bushing attached to the expanded portion, where the bushing generally prevents contact between the first and second tubes.

30 Claims, 10 Drawing Sheets

(56) References Cited

U.S. PATENT DOCUMENTS

| | | |
|---|---|---|
| 4,860,841 A | 8/1989 | Sacco |
| 4,978,104 A | 12/1990 | Gipson, Jr. |
| 5,067,692 A | 11/1991 | Nudd |
| 5,282,605 A | 2/1994 | Sauber |
| 5,299,829 A | 4/1994 | Rivers, Jr. et al. |
| 5,421,555 A | 6/1995 | Sims |
| 5,423,518 A | 6/1995 | Baxter et al. |
| 5,435,523 A | 7/1995 | Hying et al. |
| D390,503 S | 2/1998 | Gleason et al. |
| 6,302,381 B1 | 10/2001 | Roll |
| 6,446,937 B1 | 9/2002 | Straw, Sr. et al. |
| 6,874,764 B2 | 4/2005 | Drake, III |
| 6,893,006 B2 | 5/2005 | Drake, III |
| 7,325,786 B2 | 2/2008 | Drake, III |
| D568,575 S | 5/2008 | Walstrom et al. |
| D570,072 S | 5/2008 | Walstrom et al. |
| 7,407,151 B2 | 8/2008 | Rabska et al. |
| D577,175 S | 9/2008 | Walstrom et al. |
| D595,922 S | 7/2009 | Walstrom et al. |
| 8,181,983 B2 | 5/2012 | Walstrom et al. |
| RE43,535 E | 7/2012 | Roll |
| 8,348,241 B2 | 1/2013 | Trowbridge et al. |
| 8,523,148 B2 | 9/2013 | Beck et al. |
| 2002/0116881 A1 | 8/2002 | Zimmerman |
| 2006/0059656 A1 | 3/2006 | Hackett |
| 2009/0057633 A1* | 3/2009 | Beck .................. B60D 1/66 254/420 |
| 2011/0127393 A1 | 6/2011 | Shimmel |

\* cited by examiner

JACK ASSEMBLY

CROSS-REFERENCE TO RELATED APPLICATIONS

This application is a continuation of U.S. application Ser. No. 13/920,755, entitled "Jack Assembly," filed on Jun. 18, 2013, which is hereby incorporated by reference in its entirety.

TECHNICAL FIELD

The present invention relates generally to jack assemblies and, more particularly, to trailer jack assemblies having improved capabilities.

BACKGROUND

Cars, trucks, and sports utility vehicles are frequently used as towing vehicles to transport towed vehicles, such as trailers. Towed vehicles are often supported by a frame attached to the towing vehicle. A portion of the frame may extend beyond the body of the towed vehicle, toward the towing vehicle. This portion, called the tongue, is usually formed by connecting two pieces of the towed vehicle frame at a predetermined angle. A frame coupler often attaches to the tongue of the towed vehicle. The frame coupler is sized and shaped to connect to a portion of the towing vehicle.

Jack assemblies have long been used with towed vehicles, such as trailers. Typically, a jack assembly is secured to a towed vehicle and assists in stabilizing the towed vehicle while it is detached from a towing vehicle. For example, a jack assembly may be mounted to the towed vehicle tongue or directly to the frame coupler. The jack assembly may include a handle or other components to facilitate vertical movement of an outer tube with respect to an inner tube to raise and lower the jack assembly.

Jack assemblies can experience high handle torque forces, eventually resulting in galling of the inner and outer tubes. Such galling is prevalent in the area where the outer diameter of the inner tube and inner diameter of the outer tube contact each other while the jack assembly cycles up and down under load.

Standard jack assembly tubing sizes typically are designed with just enough clearance between the tubes to provide easy telescopic movement, but do not have more clearance than what is necessary for basic movement of the jack assembly. This minimal clearance does not allow for a bushing or buffering material between the tubes, which may result in such galling.

Moreover, jack assemblies typically include one or more wheels, casters, or footplates to allow for movement of the towed vehicle and/or engagement with the ground. Commonly, however, jack assemblies do not have wheels, casters or footplates that are capable of effectively handling the maximum loads or stresses for which the jack assembly is designed. Cost limitations and other restrictions prevent the current market offerings from providing a premium castering of a jack assembly. Accordingly, the castering of jack assemblies may limit the overall load capacity of the jack assembly.

Therefore, there is a need for a jack assembly that generally does not incur such galling between the inner and outer tubes. Further, there is a need for a jack assembly that includes a castering assembly that is capable of effectively handling the loads or stresses for which the jack assembly is designed while being cost efficient to manufacture. Still further, there is a need for a jack assembly that may provide improved functionality of prior art systems.

SUMMARY

A jack assembly is shown and describe. The jack assembly may include a first tube having first and second end portions and a central portion between the first and second end portions, and a second tube positioned within the first tube and movable with respect to the first tube. The jack assembly may also include an expanded portion on the first tube, the expanded portion having a larger inner diameter than an inner diameter of the central portion, and a bushing attached to the expanded portion, where the bushing generally prevents contact between the first and second tubes.

A jack assembly may include a first tube, a second tube positioned within the first tube and movable with respect to the first tube and a screw disposed within the second tube. The jack assembly may also include a nut rotationally fixed relative to the second tube and threadingly engaged with the screw, and a bushing positioned within an opening in the second tube, the bushing having an opening threadingly engaged with the screw, where the bushing, nut and second tube move in unison relative to the first tube and whereby the bushing generally prevents contact between the first and second tubes.

A jack assembly may include a first tube, and a second tube positioned within the first tube and movable with respect to the first tube. The jack assembly may also include a caster assembly connected to the second tube. The caster assembly may include a pin, and a vertical load supporting member having a first surface with at least one engagement member thereon, the engagement member engaged with a top of the pin thereby providing vertical loading to the pin and allowing relative rotation between the pin and the vertical load supporting member.

A jack assembly may include a first tube and a second tube positioned within the first tube and movable with respect to the first tube. The jack assembly may also include a caster assembly connected to the second tube. The caster assembly may include a pin having a top surface and a sidewall, and a cage member having a surface providing vertical load support to the top surface of the pin and having a sidewall that generally circumscribes at least a portion of the sidewall of the pin, wherein the pin is rotatable relative to the cage member.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

FIGS. 1 through 12 illustrate a jack assembly 10 that may generally be configured to support at least a portion of a towed vehicle, such as a trailer 11. In such embodiments, the jack assembly 10 may be operatively connected with a trailer 11 in any appropriate manner—the present teachings are not limited to the configuration shown any appropriate configuration may be utilized without departing from the present teachings. In some embodiments, the jack assembly 10 may be connected to a tongue portion of the trailer 11 to stabilize the trailer 11 when it is parked or otherwise not in an operative condition. As further described below, the height of the jack assembly 10 may be selectively adjusted to travel toward engagement with the ground or raise the jack assembly 10 as desired.

The jack assembly 10 may include a body formed by an outer tube 12. The outer tube 12 may be of any appropriate size and shape and comprised of any appropriate material, such as aluminum, extruded aluminum, or steel. In some embodiments, the outer tube 12 may be of a generally cylindrical shape; provided, however, the present teachings are not limited to this shape. The outer tube 12 in some embodiments may be of a generally rectangular, triangular, square, or oval cross-sectional shape, or may be of a combination of such cross-sectional shapes. The outer tube 12 may be generally hollow and may house components of the jack assembly 10 as described in more detail below.

An inner tube 14 may be telescopingly disposed within the outer tube 12 whereby the outer and inner tubes 12, 14 may be configured to move with respect to one another. The inner tube 14 may be any appropriate size and shape, such as generally cylindrical shape; provided, however, the present teachings are not limited to this shape. The inner tube 14 in some embodiments may be of a generally rectangular, triangular, square, or oval cross-sectional shape, or may be of a combination of such cross-sectional shapes. The inner tube 14 may be made of any appropriate material, such as aluminum, extruded aluminum, or steel, and may be painted or surface treated, such as covered in a powder coating. The inner tube 14 may be sized and shaped to fit within the hollow opening of the outer tube 12 and move telescopically therein with respect to the outer tube 12. The inner tube 14 may extend past the outer tube 12 through a bottom opening 13 in the outer tube 12. By way of a non-limiting example, the hollow opening of the outer tube 12 may be generally circular to receive a generally cylindrical inner tube 14.

As further described below, the jack assembly 10 may include a predetermined clearance between the inner tube 14 and the outer tube 12 to allow for relative movement between the inner and outer tubes 12, 14. The inner tube 14 may be of a corresponding cross-sectional shape as the outer tube 12 or may be of a generally different cross-sectional shape—the present teachings are not limited to a specific configuration.

The jack assembly 10 may include a handle assembly 16. The handle assembly 16 may be operatively connected to the jack assembly 10 at any appropriate position, such as a side 15 of the outer tube 12 or a top portion 17 of the jack assembly 10. By way of a non-limiting example, the handle assembly 16 may be selectively and operatively connected with the jack assembly at the side 15 and top portion 17. The handle assembly 16 may be generally configured to engage inner gearings 19 of the jack assembly 10 to selectively and operably raise and lower the jack assembly 10. For example, the handle assembly 16 may engage one or more gears 21 to transfer rotation of the handle assembly 16 to an internal screw 38. Rotation of the internal screw 38 may cause the inner tube 14 to operably move relative to the outer tube 12.

The jack assembly 10 may include one or more bushings 18 operatively positioned to facilitate movement of the inner tube 14 with respect to the outer tube 12. The bushings 18 may be positioned at any appropriate position on the outer tube 12 or inner tube 14 to reduce the friction between the inner and outer tubes 12, 14 during such relative movement therebetween and may generally prevent galling therebetween during operation of the jack assembly 10.

Figure 1:
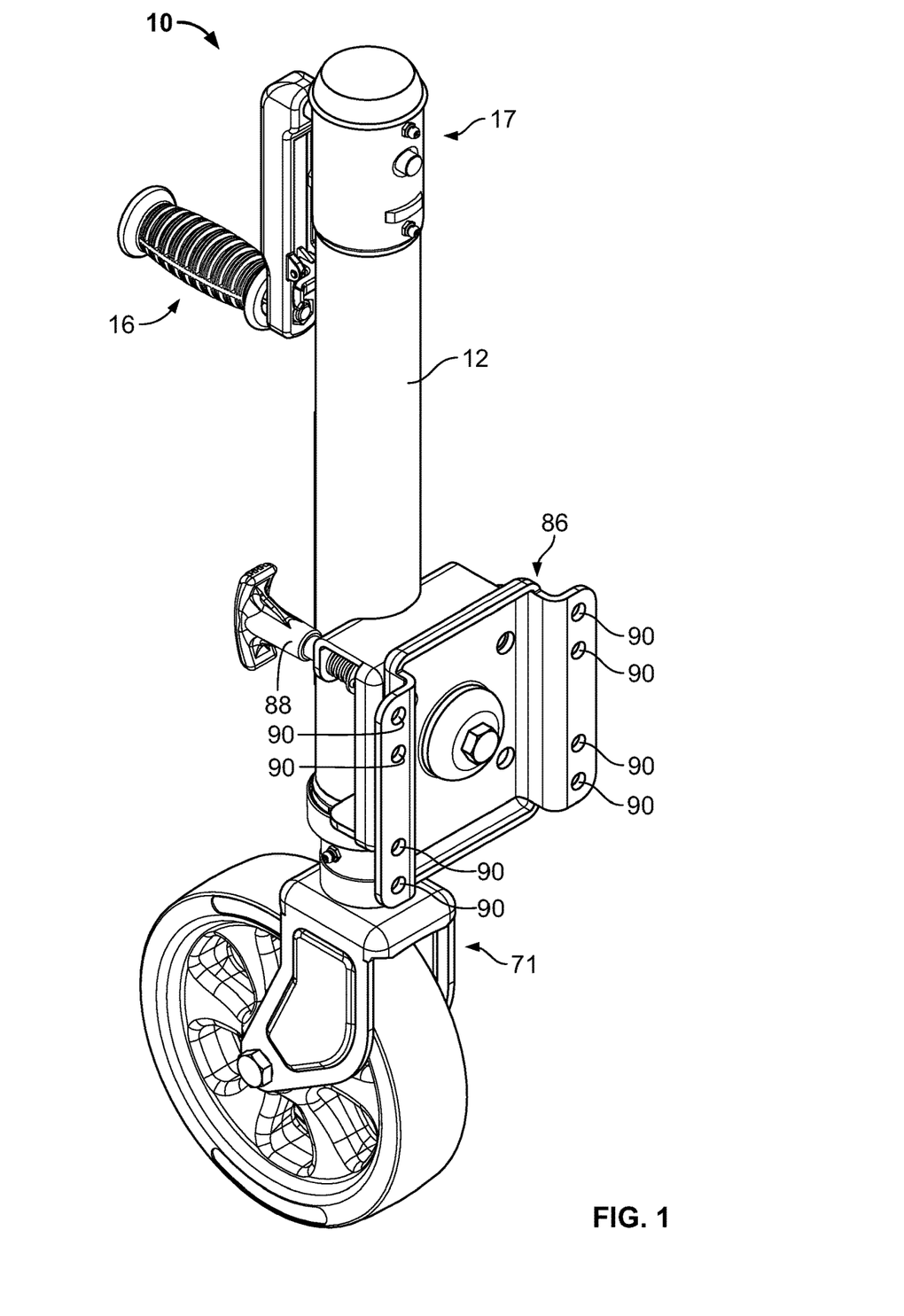
FIG. 1 is a perspective view of a jack assembly.
Figure 2:
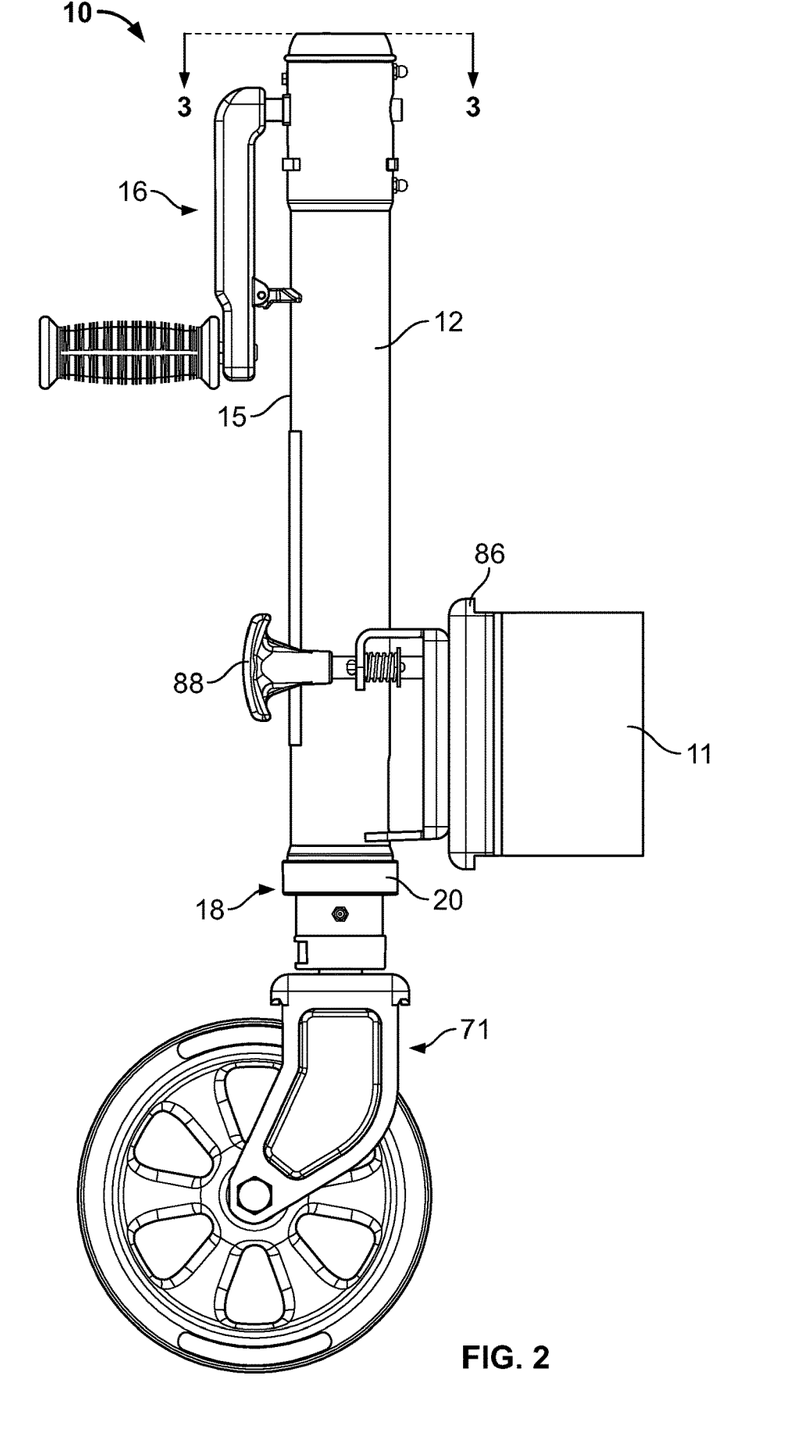
FIG. 2 is a side view of a jack assembly connected to a trailer.
Figure 3:
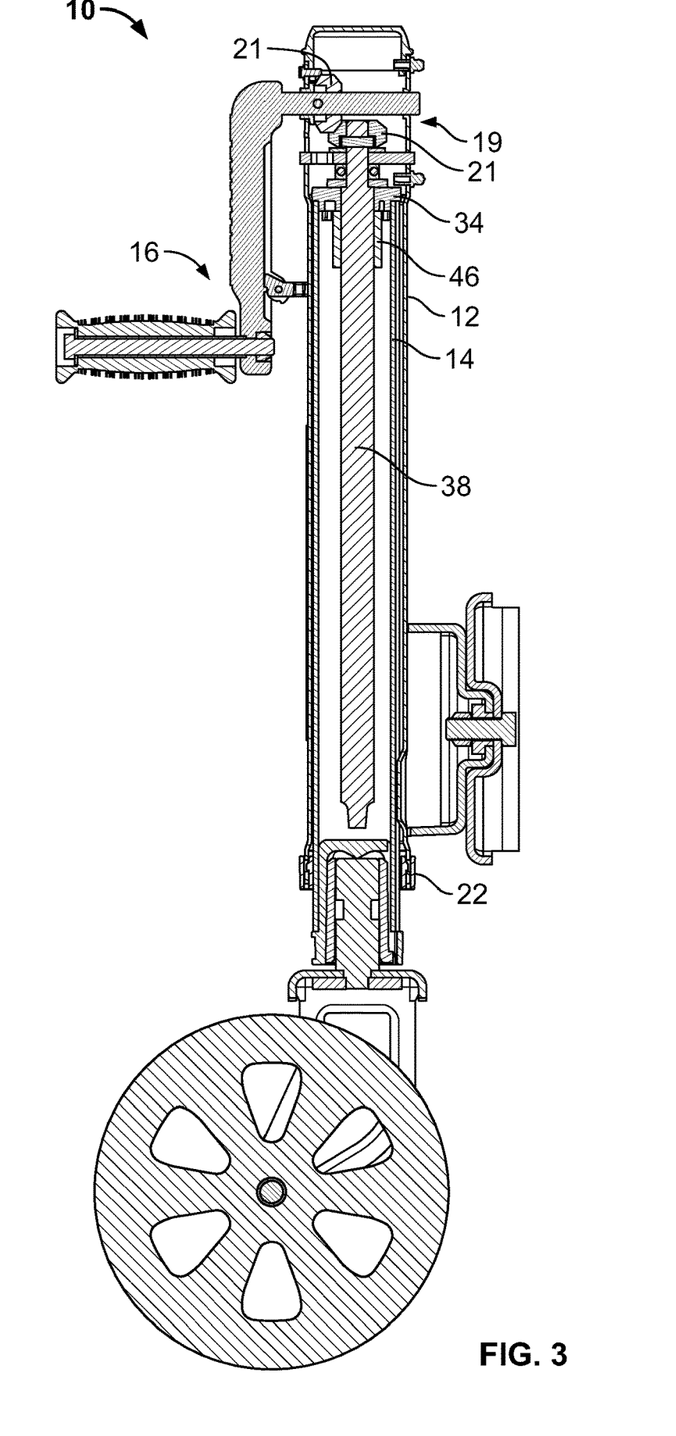
FIG. 3 is a cross-sectional view of a jack assembly along line 3-3 of FIG. 1.
Figure 4:
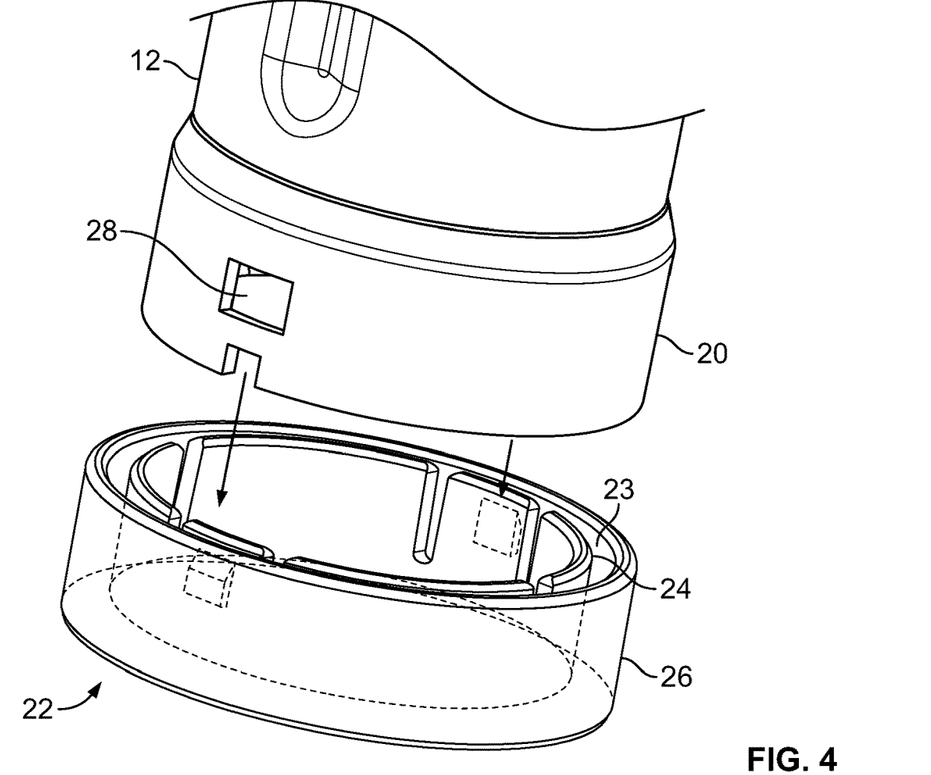
FIG. 4 is a perspective view of an outer tube and an outer tube bushing.
Figure 5:
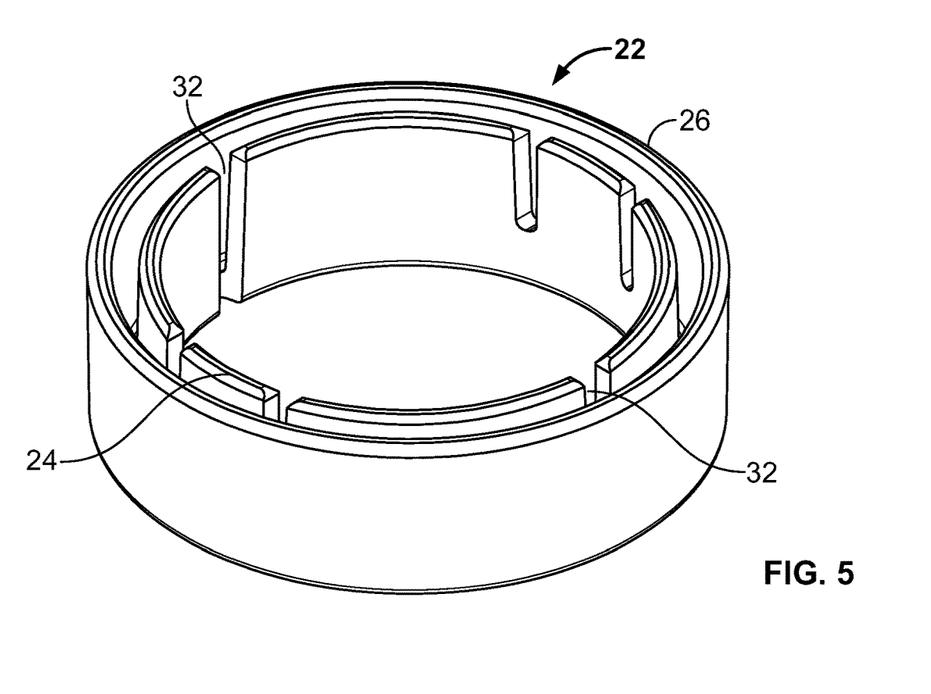
FIG. 5 is a perspective view of an outer tube bushing.
Figure 6:
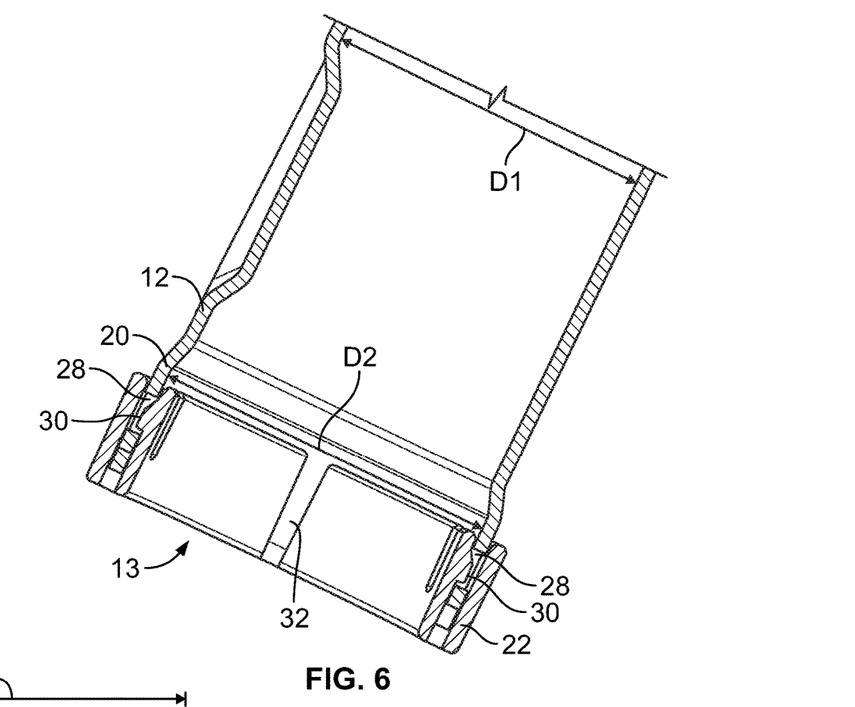
FIG. 6 is cross-sectional view of an outer tube bushing connected to an outer tube.

In embodiments, as shown in FIGS. 4-6, an outer tube bushing 22 may be connected to the outer tube 12, such by use of fasteners, being snap-fit, welded, adhered or the like. The outer tube 12 may be modified to provide additional clearance beyond the space between the outer tube 12 and the inner tube 14. For example, as shown in FIGS. 2, 4, and 6, a portion 20 of the outer tube 12 may be expanded. The expanded portion 20 may be at an end of the outer tube 12, such as the top end or bottom end of the outer tube 12. Alternatively, the expanded portion 20 may be at any appropriate position along the length of the outer tube 12. The inner diameter D1 of the outer tube 12 at the expanded portion 20 may be greater than the inner diameter D2 of the remaining portion of the outer tube 12, or greater than other portions of the outer tube 12, e.g., a central portion thereof. The increased inner diameter may provide additional clearance between the outer tube 12 and the inner tube 14 for the outer tube bushing 22.

The outer tube bushing 22 may be connected to the expanded portion 20 by any appropriate method, e.g., as described below. The jack assembly 10 may include the outer tube bushing 22 at a first end of the outer tube 12, a second end of the outer tube 12, or both ends of the outer tube 12. The outer tube bushing 22 may be any appropriate size and shape, such as generally cylindrical, and may be sized to fit over the expanded portion 20. In some embodiments, the shape of the outer tube bushing 22 may generally correspond with the cross-sectional shape of the outer tube 12, or more specifically, the cross-sectional shape of the expanded portion 20. The expanded portion 20 of the outer tube 12 may permit a larger outer tube bushing 22 to be used with the jack assembly 10. The larger outer tube bushing 22 may provide increased strength and functional longevity of the outer tube bushing 22 and as a result of the jack assembly 10. The outer tube bushing 22 may be comprised of any appropriate material, such as a polymer or a low friction nylon 6/6 polymer.

The outer tube bushing 22 may include an inner ring 24 and an outer ring 26, which may be monolithically formed. The inner ring 24 may be positioned inside the inner diameter of the outer tube 12 and the outer ring 26 may be positioned about the outer diameter of the outer tube 12. The outer tube bushing 22 may include a space 23 between the inner and outer rings 24, 26 to receive the expanded portion 20 therein. The inner ring 24 may provide a reduced-friction contact point between an inside surface of the outer tube 12 and the outer surface of the inner tube 14. The additional clearance afforded by the expanded portion 20 may allow for the inner ring 24 to be thicker to provide a more durable bushing. The inner ring 24 may therefore be adjusted in length or thickness to provide a longer or thicker outer tube bushing 22. It should be understood, however, that while the outer tube bushing 22 is shown and described with the inner and outer rings 24, 26 monolithically formed, the present teachings are not limited to this configuration. The outer tube bushing 22 may be composed of multiple components that may be attached together, such as through fastening, adhering, welding or the like. Further still, the outer tube bushing 22 may be of any appropriate cross-sectional shape, including, without limitation, generally oval, square, rectangular, triangular, circular or the like.

The outer tube bushing 22 may be fixed or fastened or otherwise connected to the outer tube 12. By way of a non-limiting example, the expanded portion 20 may include an opening 28 to receive a snap feature 30 of the outer tube bushing 22 therein. The snap feature 30 may comprise a protrusion on the exterior of the inner ring 24 or the interior of the outer ring 26 to engage the opening 28 and prevent rotational or vertical movement of the outer tube bushing 22 with respect to the outer tube 12; see FIG. 6. Upon operative assembly of the jack assembly 10, the inner tube 14 may be positioned inside of and against the inner ring 24 to hold the snap feature 30 engaged with the opening 28 and prevent movement of the outer tube bushing 22 with respect to the outer tube 12. It will be appreciated that the outer tube bushing 22 may be adhered or otherwise fastened to the outer tube 12 in place of or in addition to the snap engagement.

The outer tube bushing 22 may include one or more features to facilitate draining of water or other fluids from the jack assembly 10. For example, the outer tube bushing 22 may include one or more slots or openings 32 to allow the fluid to drain therethrough. In some embodiments, these slots 32 may extend an entirety or majority height of the inner ring 24. This may generally prevent fluids, such as water, from being retained with the jack assembly 10. Avoiding water retention may extend the life of the jack assembly 10.

Figure 7:
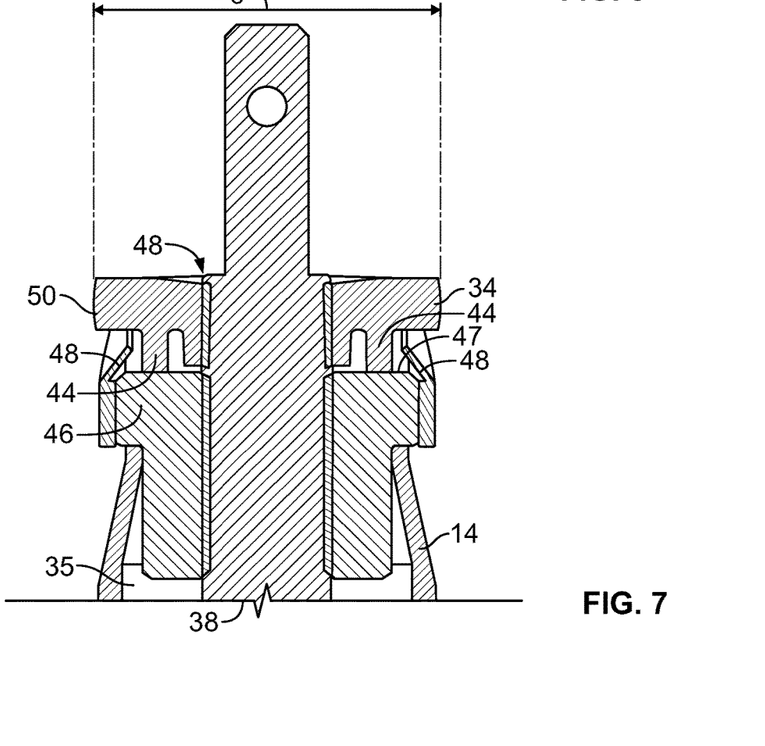
FIG. 7 is a cross-sectional view of an inner tube bushing connected to an inner tube.
Figure 8:
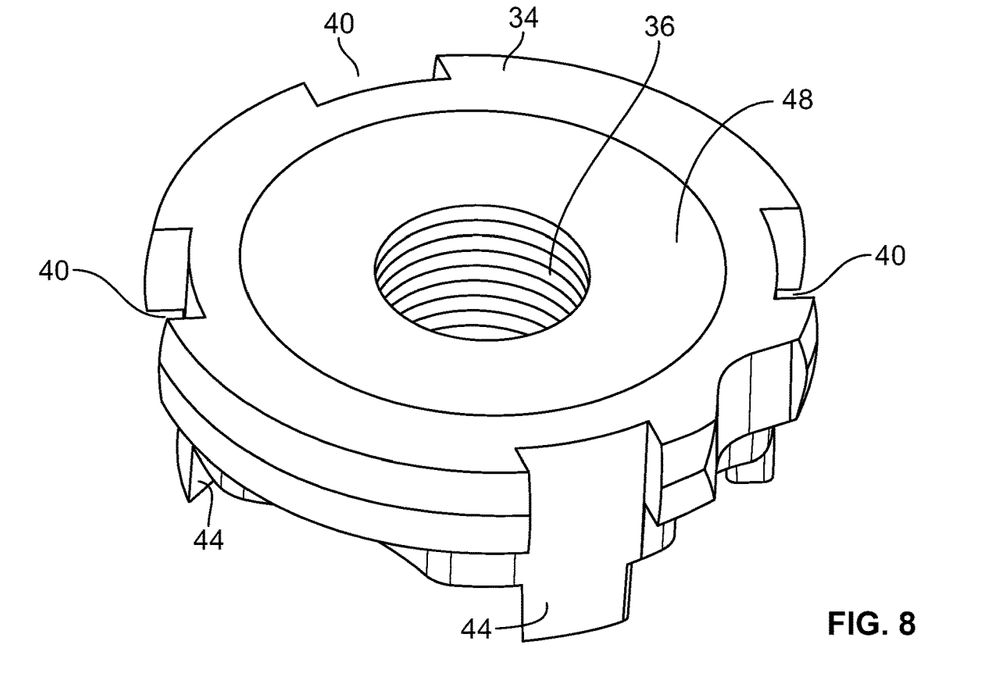
FIG. 8 is a perspective view of an inner tube bushing.
Figure 9:
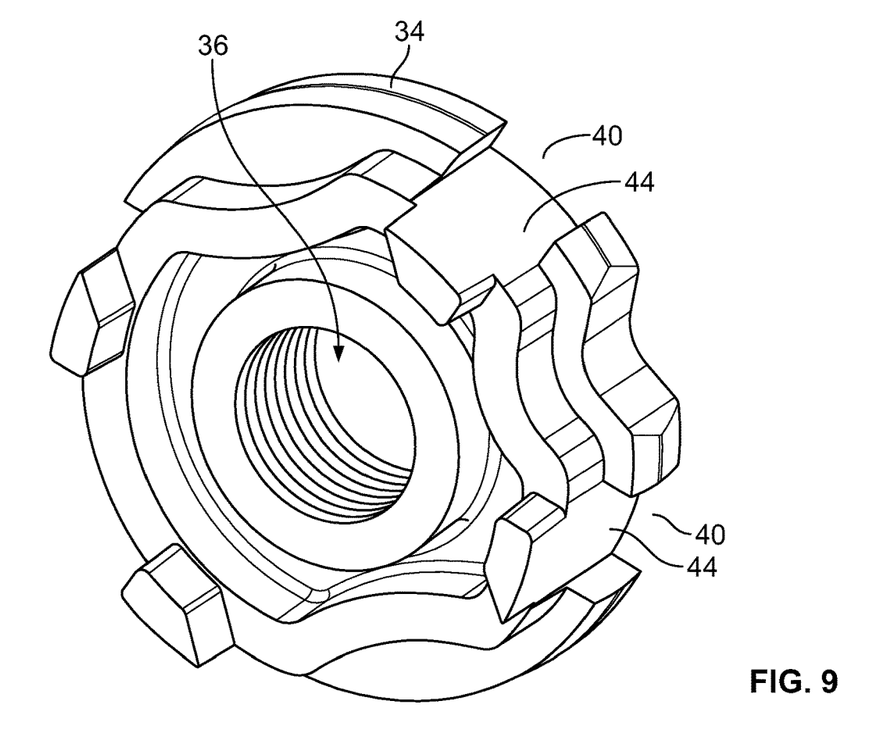
FIG. 9 is a bottom perspective view of an inner tube bushing.

As shown in FIGS. 7-9, an inner tube bushing 34 may be connected to the inner tube 14. The jack assembly 10 may include the inner tube bushing 34 at a first end of the inner tube 14, a second end of the inner tube 14, or both ends of the inner tube 14. The inner tube bushing 34 may be any appropriate size and shape, such as generally cylindrical, and may be sized to fit within an opening 35 in the inner tube 14. In some embodiments, the inner tube bushing 34 may be of a shape substantially similar to that of the cross-sectional shape of the inner tube 14. The inner tube bushing 34 may be comprised of any appropriate material, such as a polymer or a low friction nylon 6/6 polymer.

The inner tube bushing 34 may be positioned in the opening 35 of the inner tube 14, and retained therein as described below. The inner tube bushing 34 may include an opening 36 therein. The opening 36 may be generally centrally located on the inner tube bushing 34 and may be of any appropriate size and shape, such as generally circular. The opening 36 may be arranged to receive the internal screw 38 therethrough. The opening 36 may be threaded to engage the threads of the internal screw 38 to prevent the axial movement of the inner tube bushing 34. Specifically, the threaded opening 36 may operatively engage with the threads of the internal screw 38. As the internal screw 38 is rotated it may move axially with respect to the inner tube bushing 34, which may result in the inner tube bushing 34 being retained in its position at the top of the inner tube 14, which may be normal contact area between the inner and outer tubes 12, 14. This may result in the inner tube bushing 34 being generally prevented from axial movement with respect to the inner tube 14.

The inner tube bushing 34 may include one or more recessed portions 40 positioned about its outer diameter. The recessed portions 40 may comprise a generally rectangular recess in the outer surface of the inner tube bushing 34, as shown in FIG. 8. The recessed portions 40 may be areas of relief. These areas of relief may allow water or other fluids to escape through the inner tube bushing 34, i.e., the recessed portions 40 may facilitate draining of water or other fluids from the jack assembly 10. This may generally prevent fluids, such as water, from being retained with the jack assembly 10. Avoiding water retention may extend the life of the jack assembly 10.

Figures 14, 15:
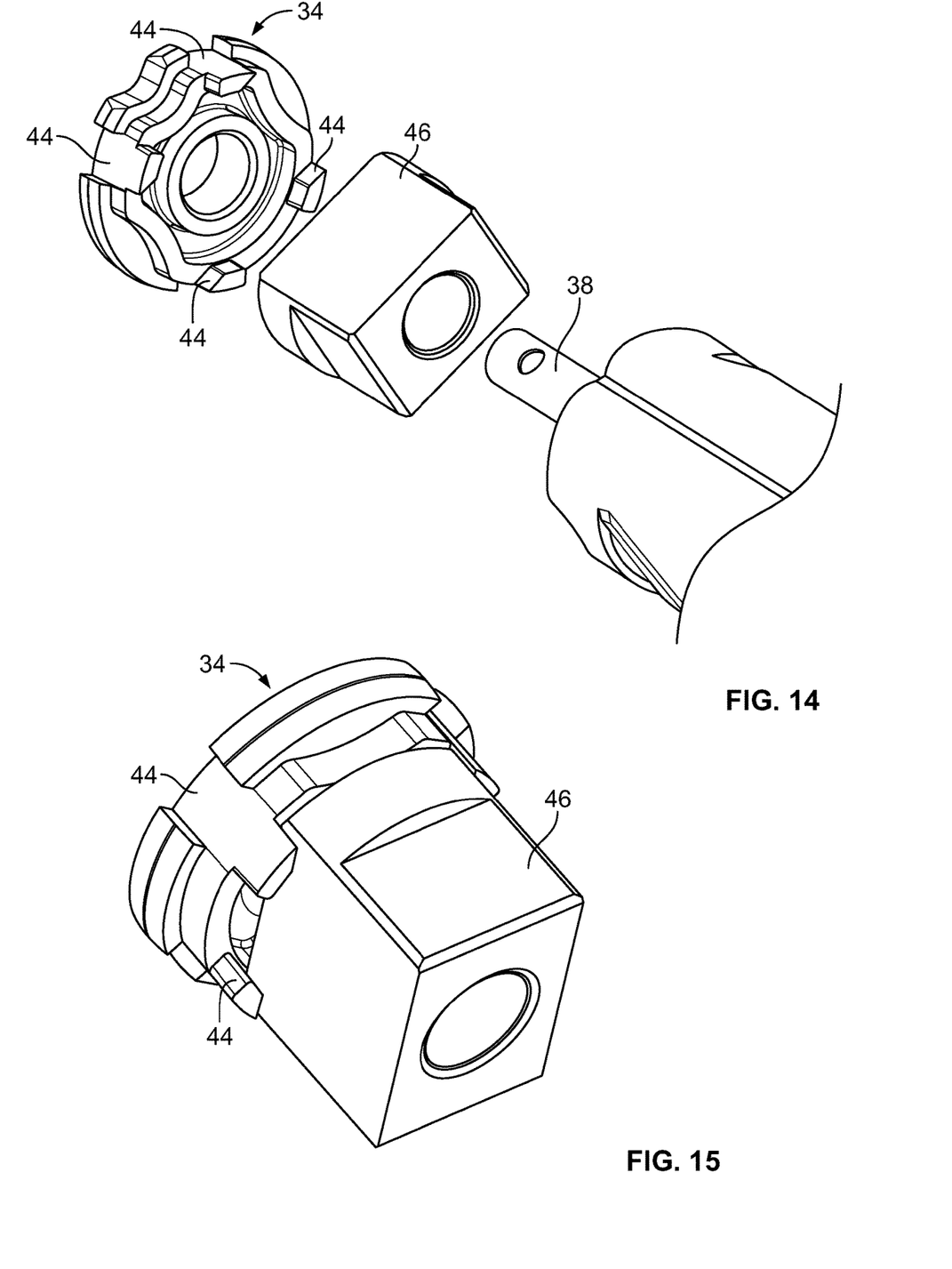
FIG. 14 is an exploded view of an inner tube bushing, jack screw and jack nut.
FIG. 15 is a perspective view of a jack nut engaged with an inner tube bushing.

The inner tube bushing 34 may include one or more posts 44. The posts 44 may be any appropriate size and shape, such as generally rectangular, and located at any appropriate position. For example, the posts 44 may be positioned along one or more of the recessed portions 40. The posts 44 may extend beyond the bottom profile of the inner tube bushing 34 to position the inner tube bushing 34 with respect to other components inside the inner tube 14. For example, during assembly, the inner tube bushing 34 may be inserted into the inner tube opening 35 on top of a jack nut 46 with a portion adjacent to the jack nut 46 and engaged therewith, as shown in FIGS. 7 and 14-15. The inner tube bushing 34 may be positioned adjacent to the jack nut 46 such that the posts 44 may protrude into an opening in the jack nut 46 or in engagement with a side of the jack nut 46 and into an opening in the inner tube 14. The internal screw 38 may then be threaded through the jack nut 46 and through the threaded opening 36 in the inner tube bushing 34. The posts 44 may help to maintain positioning of the inner tube bushing 34 with respect to the jack nut 46, i.e., the posts 44 may engage a portion or portions of the jack nut 46 to generally prevent rotation of the inner tube bushing 34. In such embodiments, the posts 44 may capture or engage around a portion of the jack nut 46, e.g., side portions of the jack nut 46, to generally prevent rotational movement thereof. By way of a non-limiting example, the inner tube bushing 34 may be positioned immediately above the jack nut 46. The posts 44 of the inner tube bushing 34 may extend below a top surface 47 of the jack nut 46 and engage side portions of the jack nut 46. This engagement may generally prevent rotation of the inner tube bushing 34 with respect to the jack nut 46 and inner tube 14. In some embodiments, the posts 44 may extend into and generally below the top surface 47 of the jack nut 46 to assist in preventing rotational movement of the inner tube bushing 34.

Moreover, the inner tube 14 may include one or more crimped portions 48 that may be formed to protrude into the inner tube bushing 34. The crimped portions 48 may contact the posts 44 of the inner tube bushing 34 to generally prevent rotational movement with respect to the inner tube 14. Moreover, the crimped portions 48 may be formed by folding a portion of the inner tube 14 such as through a subsequent operation. Any number of crimped portions 48 may be formed. The crimped portions 48 may also engage the jack nut 46 to generally prevent it from dislodging from the inner tube 14.

The inner tube bushing 34 may be configured to direct grease and other lubricating fluid toward the internal screw 38. For example, a top surface of the inner tube bushing 34 may include a chamfered surface 48. The chamfered surface 48 may be angled downward toward the opening 36, as shown in FIG. 7. The chamfered surface 48 may be arranged at any appropriate angle, such as an angle between 0-30 degrees. The angle of the chamfered surface 48 may allow gravity to direct oil, grease and other liquid to the opening 36 to provide drainage of fluid and to direct lubrication toward the internal screw 38.

An outer diameter $D_3$ of the inner tube bushing 34 may be shaped to provide free movement and reduce friction with the interior surface of the outer tube 12. For example, the outer diameter $D_3$ of the inner tube bushing 34 may be convexly shaped portion 50. As shown in FIG. 8, the rounded or convex shape 50 of the outer diameter $D_3$ may provide a reduced contact surface between the inner tube bushing 34 and the outer tube 12. The smaller contact surface may result in reduced friction between the inner tube bushing 34 and the outer tube 12, thus providing freer movement of the outer and inner tubes 12, 14 with respect to one another.

In some embodiments, the jack assembly 10 may include the inner tube bushing 34 located at the top of the inner tube 14 and an outer tube bushing 22 located at the expanded portion 20 near the bottom of the outer tube 12. It will be appreciated, however, that the jack assembly 10 may include any arrangement of outer tube bushings 22 and inner tube bushings 34 disposed on the outer tube 12 and inner tube 14.

The jack assembly 10 may include a caster assembly 52 of an appropriate configuration. The caster assembly 52 may be positioned at or near the base of the jack assembly 10 and may be configured to selectively engage the ground to support the trailer 11. The caster assembly 52 may operatively engage and connect to the inner tube 14 in an appropriate manner.

Figure 13:
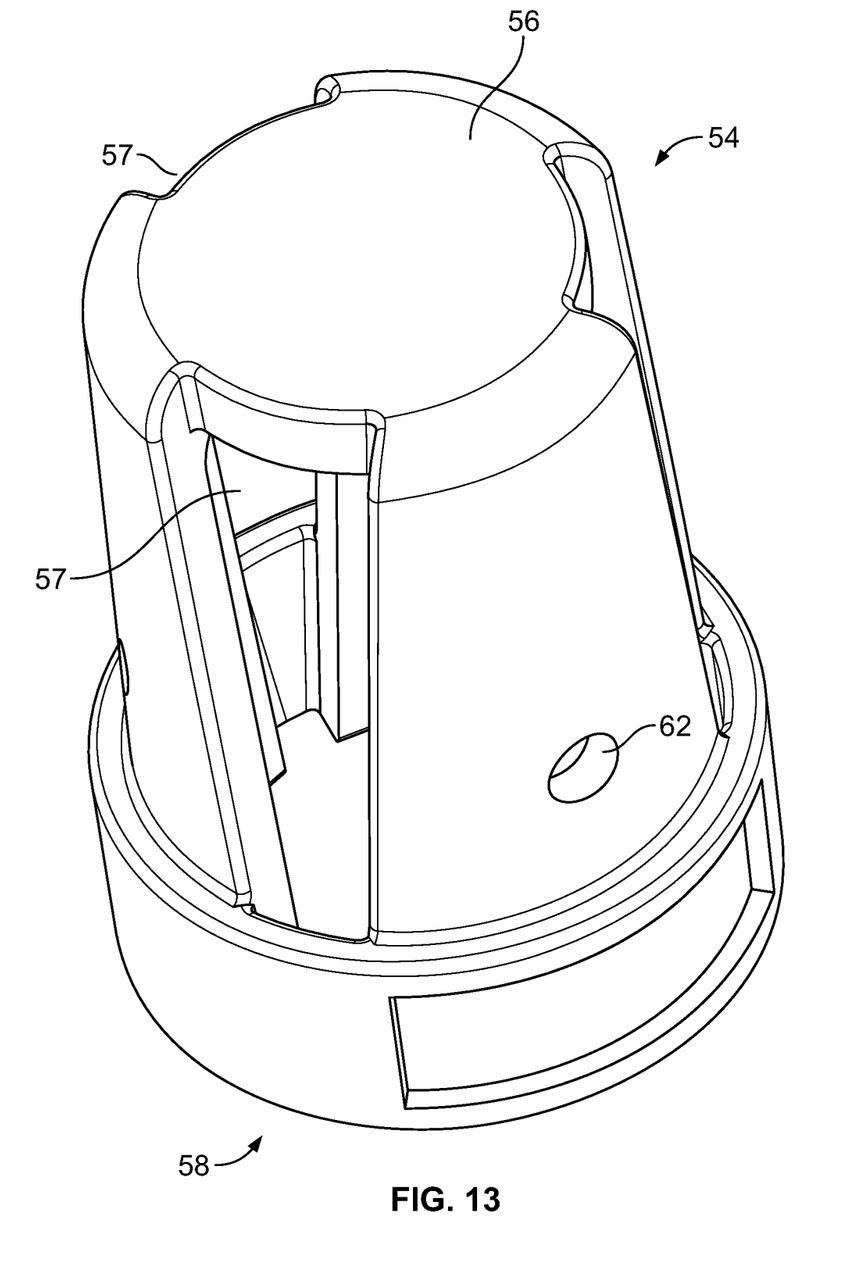
FIG. 13 is a perspective view of a cage member of a caster assembly.

The caster assembly 52 may include a cage member/outer sleeve 54 such as that shown in more detail in FIG. 13. The cage member 54 may be arranged to fit within the opening 35a of the inner tube 14. The cage member 54 may be any appropriate size and shape, such as generally cylindrical shape. The cage member 54 may be generally closed at a first end 56 and open at a second end 58. The closed first end 56 may be positioned within the inner tube opening 35a and the open end 58 may be positioned outside the inner tube 14. The closed first end 56 may be positioned to allow a clearance between the bottom of the internal screw 38 and the cage member 54. The clearance may prevent buildup of dirt and other contamination. The open end 58 may be configured to receive the remaining parts of the caster assembly 52 as described in more detail below. The cage member 54 may include one or more openings 57. The openings 57 may reduce material used to make the cage member 54 reducing its cost and weight. The openings 57 may also provide drainage channels to fluid trapped outside of the cage member 54, i.e., between the cage member 54 and the inner tube 14. This may allow drainage for liquid, such as water, to flow out of the jack assembly 10.

The cage member 54 may include a lip 60. The lip 60 may be formed about an outer bottom portion of the cage member 54, such as a protrusion extending from the outer surface of the cage member 54. The lip 60 may form a ledge that is positioned below the inner tube 14 and may support the inner tube 14 when the jack assembly 10 is under a typical load. This may allow vertical loading to transfer through the cage member 54 and onto the inner tube 14. Under some loads, the inner tube 14 may be spaced apart from the lip 60 to provide a clearance for dirt, contamination and fluid to escape from the jack assembly 10.

The cage member 54 may be any appropriate shape, such as generally tapered from the closed first end 56 to the open end 58. The outer and inner diameters of the cage member 54 may be smaller at the closed first end 56 and larger at the open end 58. The tapered shape may provide a clearance between the inner surface of the inner tube 14 and the cage member 54 to allow for drainage of fluid and contamination from inside the jack assembly 10.

The cage member 54 may include one or more openings 62. The openings 62 may be any appropriate size and shape, such as generally circular, and may be located along the side of the cage member 54. The openings 62 may be aligned with openings 63 in the inner tube 14 and positioned to allow fluid and contamination to escape from within the tapered clearance between the cage member 54 and the inner tube 14. The openings 62 may further be utilized to operatively fasten or connect the caster assembly 52 to the inner tube 14.

Figure 10:
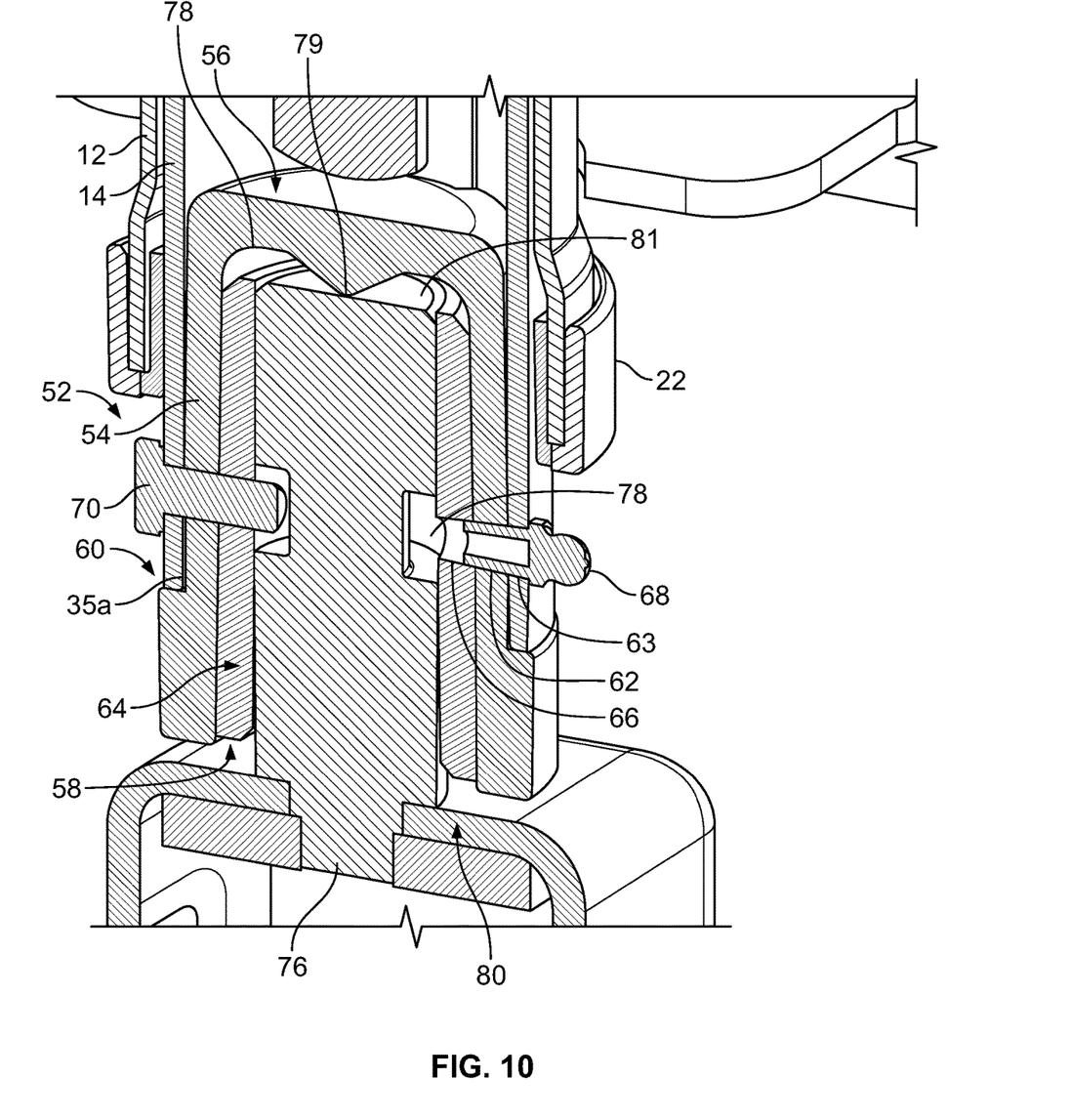
FIG. 10 is a cross-sectional view of a caster assembly.

The caster assembly 52 may include a caster bushing 64. The caster bushing 64 may be positioned within the cage member 54, as shown in FIG. 10. The caster bushing 64 may be any appropriate size and shape, such as generally cylindrical, and have an opening on each end. The caster bushing 64 may be tapered along its outer diameter to generally match and align with the taper of the inner diameter of the cage member 54. The inner diameter of the caster bushing 64 may be straight or less tapered than the outer diameter to engage a device inserted therein. The caster bushing 64 may be comprised of any appropriate material, such as a polymer or a low friction nylon 6/6 polymer. In some embodiments, at the moment a load is applied to the caster assembly 52, load may be applied through the caster bushing 64, i.e., a moment load may be applied through the caster bushing. This load, however, may only be instantaneous and then applied as described in more detail below or may be applied throughout operation of the jack assembly 10.

The caster bushing 64 may include one or more openings 66. The openings 66 may be positioned to generally align with the openings in the cage member 54 and inner tube 14. The aligned openings 62, 63, and 66 may be configured to receive a plug, such as a grease fitting 68. The grease fitting 68 may be removed to allow for drainage or to add lubrication to the caster assembly 52. The aligned openings 62, 63, and 66 may alternatively receive a bolt 70 to retain a wheel or other device within the caster assembly 52. The openings 66 may be smaller in diameter than the openings 62 of the cage member 54 and/or the openings 63 in the inner tube 14. The smaller openings 66 may act as a lock feature to the bolt 70 to help retain the bolt 70 within the openings 62, 63, and 66. In some embodiments, the caster assembly 52 may include two openings 62, 66 in the cage member 54 and caster bushing 64 and two openings 63 in the inner tube 14. The present teachings, however, are not limited to two openings 62, 63 and 66; any number of openings may be used without departing from the present teachings. The first aligned openings 62, 63 and 66 may receive the grease fitting 68 while the second aligned openings 62, 63 and 66 may receive a bolt 70 therein. However, the present teachings are not limited to this configuration. The openings 62, 63 and 66 may allow for material reduction, which may make the applicable element lighter and may act as drainage channels.

Figure 11:
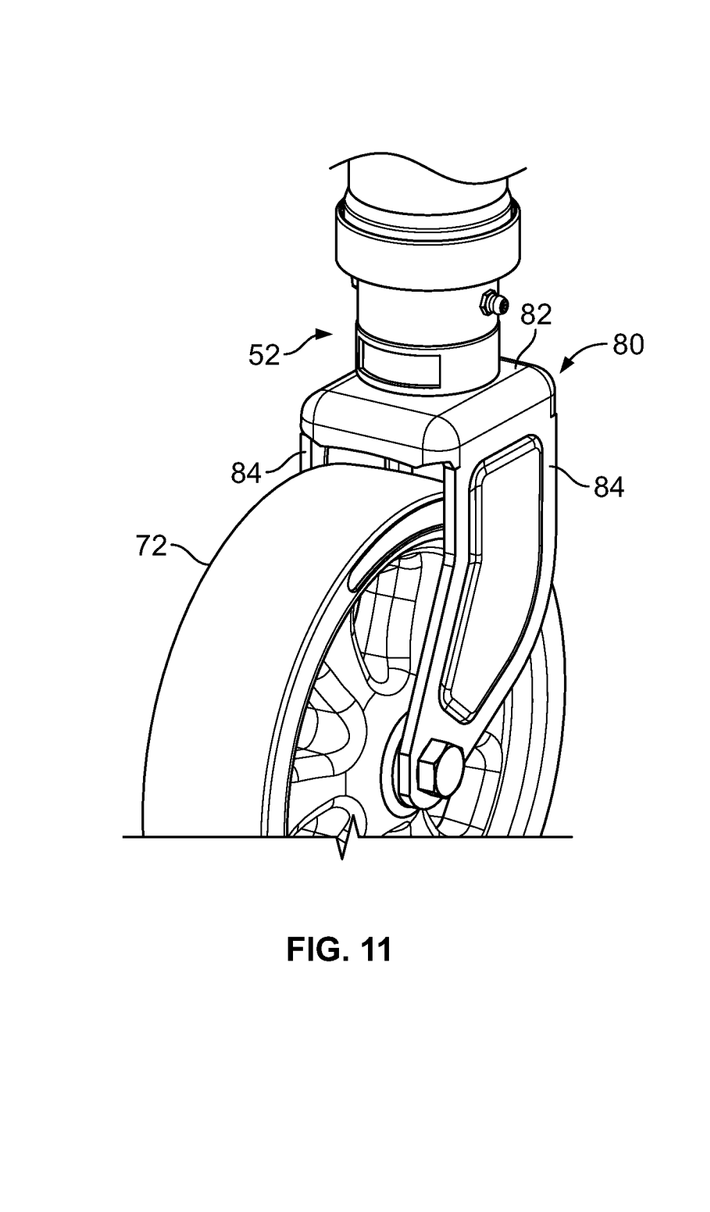
FIG. 11 is a perspective view of a wheel connected to a caster assembly.
Figure 12:
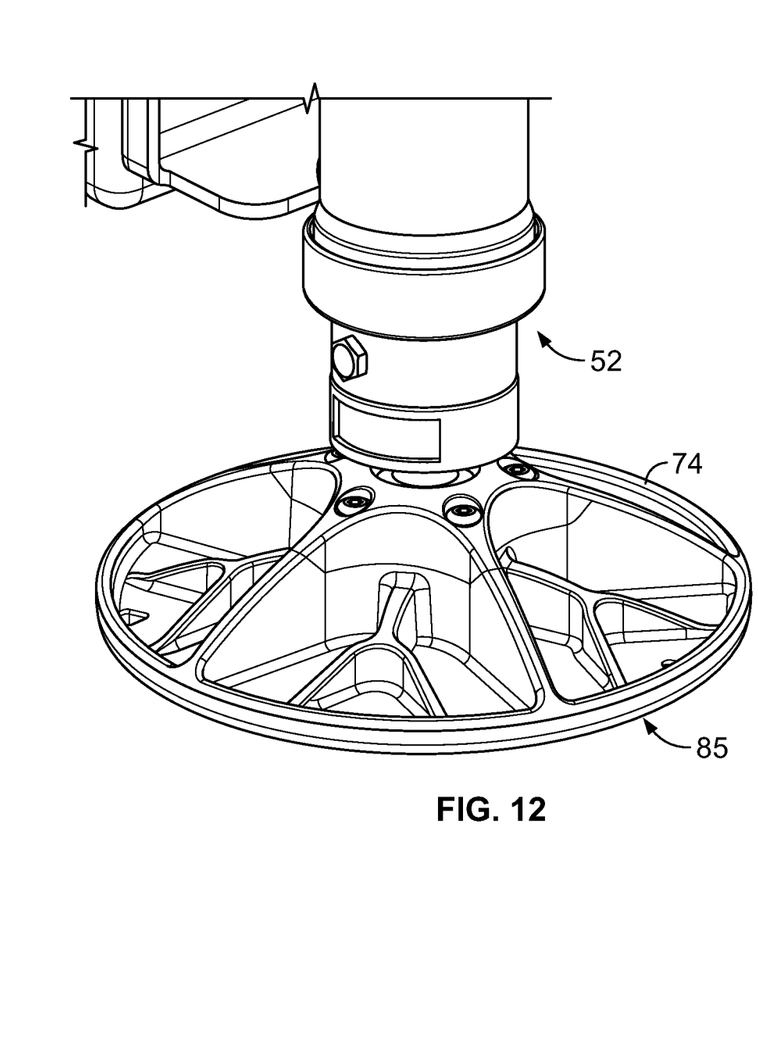
FIG. 12 is a perspective view of a footplate connected to a caster assembly.

The caster assembly 52 may be configured to receive a support device 71 within the caster bushing 64. For example, a caster wheel 72 or a footplate 74, as shown in FIGS. 11 and 12, may be connected to the caster assembly 52 to provide a contact point with the ground.

The support device 71 may include a pin 76 to connect to the caster assembly 52. The pin 76 may be any appropriate size and shape, such as generally cylindrical to fit within the caster bushing 64, e.g., the pin 76 may be operatively inserted into the cage member 54 and may wedgingly engage with the caster bushing 64. The pin 76 may include a recess 78 about its circumference generally aligned with the openings 62, 63 and 66. The bolt 70 inserted through the aligned openings 62, 63 and 66 may engage the recess 78, as shown in FIG. 10, to retain the support device 71 within the caster assembly 52 while still allowing pivotal or rotational movement of the support device 71.

During operation of the jack assembly, a load may be applied generally between the top of the pin 76 and the cage member 54. In such embodiments, the cage member 54 may act as a vertical load supporting member. An antifriction or friction reduction member may be positioned between a top surface 77 of the pin 76 and an inside top surface 81 of the cage member 54. The friction reduction member may assist with rotation of the pin 76 with respect to the cage member 54. Further, vertical loading of the pin 76 during operation of the jack assembly 10 may be applied through the friction reduction member and to the cage member 54. The friction reduction member may be of any appropriate configuration. By way of a non-limiting example, the friction reduction member may include a disc member such as a washer and may be of any appropriate low friction material such as metal, polymer, low friction nylon 6/6 polymer. By way of a further non-limiting example, the friction reduction member may include an engagement member such as a projection 79 of the cage member 54; see FIG. 10.

The projection 79 may be a point contact, such as a single point contact or multi-point contact, between the pin 76 and the cage member 54. The projection 79 may allow easy rotation of the pin 76 with respect to the cage member 54. The projection 79 may further provide better disbursement of the jack assembly load through the cage member 54 and may ultimately be applied through the inner tube 14, thereby increasing the maximum load that the wheel 72 is able to support and in turn increasing the maximum load that the jack assembly 10 may support. It should be understood, however, that the load of the present teachings is not limited to a single point load as shown. The load could also be carried by a bearing or other appropriate arrangement of the cage member 54. Further, contact between the projection 79 and pin 76 may help orient the wheel 72 or the applicable attachment relative to the outer tube 12 and/or inner tube 14. The projection 79 further may, upon vertical loading, result in little resistant torque such that the caster assembly 52 and wheel 72 may rotate generally freely.

The wheel 72 may be coupled to a brace 80. The brace 80 may be connected to the pin 76, such as welded thereto or any other appropriate means. The brace 80 may include a yoke 82 and one or more wheel brackets 84 extending from the yoke 82. The wheel 72 may be connected to the wheel brackets 84 and rotate with respect thereto. The yoke 82 may be in proximity to the cage member 54 as shown in FIG. 10.

The wheel 72 may be any appropriately sized wheel, such as a 6" wheel or an 8" wheel. The wheel 72 may allow for movement of the trailer 11 when the jack assembly 10 is engaged with the ground. The wheel 72 may be of any appropriate configuration and is not limited to that shown. By way of a non-limiting example, the wheel 72 may be a dual wheel configuration. The wheel 72 may be made of any appropriate material, including, without limitation, steel, phenolic or the like.

The footplate 74 may be any appropriate size and shape, such as generally round and having a generally flat bottom surface 85. The footplate 74 may be configured to swivel with respect to the caster assembly 52 to accommodate variations in the ground surface. For example, the footplate 74 may include a socket for receiving a ball connected to the pin 76 to allow the footplate 74 to rotate and swivel with respect to the caster assembly 52. In some embodiments, the footplate 74 may be of any appropriate shape, including, without limitation being generally rectangular. Moreover, the footplate 74 may be fixedly secured, i.e., not swivel with respect to the caster assembly 52.

The jack assembly 10 may include a mounting bracket 86. The mounting bracket 86 may be connected to the jack assembly 10 at any appropriate location, such as along the outer tube 12 or at the top of the jack assembly 10. In some embodiments, the mounting bracket 86 may be adjustable along the length of the outer tube 12. For example, the mounting bracket 86 may be selectively positionable with respect to the outer tube 12 and may permit the jack assembly 10 to be pivotable with respect to the trailer 11. In such embodiments, a bolt 88 or other device may selectively engage the mounting bracket 86 whereby upon release of the bolt 88 such as through axial positioning, the jack assembly 10 may pivot with respect to the mounting bracket 86. The mounting bracket 86 may be selectively mounted to the trailer 11 through mounting holes 90 on the mounting bracket 86.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

What is claimed is:

1. A jack assembly comprising:
   a first tube having first and second end portions and a central portion between said first and second end portions;
   a second tube positioned within said first tube and movable with respect to said first tube;
   an expanded portion on said first tube, said expanded portion having a larger inner diameter than an inner diameter of said central portion; and
   a bushing attached to said expanded portion, wherein said bushing generally prevents contact between said first and second tubes.

2. The jack assembly of claim 1, wherein said expanded portion is located at either of said first end or said second end of said first tube.

3. The jack assembly of claim 1, further comprising an engaging feature in a side of said first tube and an engaging member on said bushing, wherein said engaging feature engages said engaging member retaining said bushing to said expanded portion.

4. The jack assembly of claim 3, wherein said engaging member comprises a protrusion in said bushing.

5. The jack assembly of claim 1, wherein said bushing includes at least one drain slot positioned on said bushing, said drain slot extending from an upper surface to a lower surface of said bushing along an inner side wall of said bushing.

6. The jack assembly of claim 1, wherein an inner surface of said bushing is a discontinuous surface.

7. The jack assembly of claim 1, wherein said second tube includes an outer sidewall in direct contact with said bushing as said second tube moves relative to said first tube.

8. A jack assembly comprising:
a first tube;
a second tube positioned within said first tube and movable with respect to said first tube;
a screw disposed within said second tube;
a nut rotationally fixed relative to said second tube and threadingly engaged with said screw; and
a bushing positioned within an opening in said second tube, said bushing having an opening threadingly engaged with said screw, wherein said bushing, nut and second tube move in unison relative to said first tube and whereby said bushing generally prevents contact between said first and second tubes and wherein said bushing includes at least one recessed portion along an outer diameter of said bushing, whereby said recessed portion allows drainage.

9. The jack assembly of claim 8, wherein said bushing includes at least one post, whereby said at least one post engages said nut and generally prevents rotation of said bushing relative to said second tube.

10. The jack assembly of claim 8, wherein an outer diameter of said bushing is generally convex shaped thereby providing reduced contact with an inner sidewall of said first tube.

11. A jack assembly comprising:
a first tube;
a second tube positioned within said first tube and movable with respect to said first tube;
a caster assembly connected to said second tube, said caster assembly comprising:
a pin having a top surface and a sidewall;
a cage member having a surface providing vertical load support to said top surface of said pin and having a sidewall that generally circumscribes at least a portion of said sidewall of said pin, wherein said pin is rotatable relative to said cage member; and
a bushing positioned between said sidewall of said pin and said sidewall of said cage member.

12. The jack assembly of claim 11, wherein said cage member is configured to engage with a lower portion of said second tube transferring vertical load through said cage member to said second tube.

13. The jack assembly of claim 12, wherein said cage member includes a lip portion whereby said second tube operatively engages said lip portion transferring said vertical load.

14. The jack assembly of claim 11, wherein said surface includes a projection depending therefrom providing point contact between said cage member and said pin.

15. The jack assembly of claim 14, wherein projection is monolithically formed with said cage member as a casting.

16. The jack assembly of claim 14, wherein said projection provides vertical loading to said pin and allows relative rotation between said pin and said cage member.

17. The jack assembly of claim 11, further comprising an antifriction device positioned between said top surface of said pin and said surface of said cage member.

18. The jack assembly of claim 17, wherein said antifriction device includes a washer.

19. The jack assembly of claim 11, wherein said cage member includes at least one relief providing drainage from said second tube.

20. The jack assembly of claim 11, wherein second tube includes a sidewall generally free of a deformation and including a pair of opposed openings.

21. The jack assembly of claim 11, wherein said sidewall of said cage member provides side loading support of said pin.

22. The jack assembly of claim 11, wherein said bushing includes a tapered outer diameter and a generally non-tapered inner diameter.

23. The jack assembly of claim 22, further comprising a support device operatively engaged with said caster assembly.

24. The jack assembly of claim 23, wherein said bushing wedgingly secures said support device with said sleeve.

25. The jack assembly of claim 24, wherein a moment load is applied through said bushing upon loading of said support device.

26. The jack assembly of claim 11, wherein said cage member is tapered and configured to wedgingly engage said second tube.

27. A jack assembly comprising:
a first tube;
a second tube positioned within said first tube and movable with respect to said first tube;
a screw disposed within said second tube;
a nut rotationally fixed relative to said second tube and threadingly engaged with said screw; and
a bushing positioned within an opening in said second tube, said bushing having an opening threadingly engaged with said screw, wherein said bushing, nut and second tube move in unison relative to said first tube and whereby said bushing generally prevents contact between said first and second tubes and wherein said bushing includes a discontinuous outer sidewall whereby said discontinuous outer sidewall allows drainage.

28. A jack assembly comprising:
a first tube;
a second tube positioned within said first tube and movable with respect to said first tube;
a screw disposed within said second tube;
a nut rotationally fixed relative to said second tube and threadingly engaged with said screw; and
a bushing positioned within an opening in said second tube, said bushing having an opening threadingly engaged with said screw, wherein said bushing, nut and second tube move in unison relative to said first tube and whereby said bushing generally prevents contact between said first and second tubes and wherein a top surface of said bushing includes a chamfered portion, whereby said chamfered portion is angled toward said opening forming a funnel for fluid.

29. A jack assembly comprising:
a first tube;
a second tube positioned within said first tube and movable with respect to said first tube;

a caster assembly connected to said second tube, said caster assembly comprising:
    a pin having a top surface and a sidewall;

a cage member having a surface providing vertical load support to said top surface of said pin and having a sidewall that generally circumscribes at least a portion of said sidewall of said pin, wherein said pin is rotatable relative to said cage member; and     an antifriction device positioned between said top surface of said pin and said surface of said cage member.

30. A jack assembly comprising:
a first tube;
a second tube positioned within said first tube and movable with respect to said first tube;
a caster assembly connected to said second tube, said caster assembly comprising:
    a pin having a top surface and a sidewall;

a cage member having a surface providing vertical load support to said top surface of said pin and having a sidewall that generally circumscribes at least a portion of said sidewall of said pin, wherein said pin is rotatable relative to said cage member, wherein said cage member includes at least one relief providing drainage from said second tube.

\* \* \* \* \*